US010210517B2

United States Patent
Hammad et al.

(10) Patent No.: US 10,210,517 B2
(45) Date of Patent: *Feb. 19, 2019

(54) ALERT PRIORITIZATION LOGIC

(71) Applicant: Visa International Service Association, San Francisco, CA (US)

(72) Inventors: Ayman Hammad, Pleasanton, CA (US); Mark Carlson, Half Moon Bay, CA (US)

(73) Assignee: Visa International Service Association, San Francisco, CA (US)

( * ) Notice: Subject to any disclaimer, the term of this patent is extended or adjusted under 35 U.S.C. 154(b) by 374 days.

This patent is subject to a terminal disclaimer.

(21) Appl. No.: 15/194,335

(22) Filed: Jun. 27, 2016

(65) Prior Publication Data

US 2016/0307180 A1    Oct. 20, 2016

Related U.S. Application Data

(63) Continuation of application No. 12/764,662, filed on Apr. 21, 2010, now Pat. No. 9,406,057.

(Continued)

(51) Int. Cl.
*G06Q 20/40* (2012.01)
*G08B 5/22* (2006.01)
(Continued)

(52) U.S. Cl.
CPC ......... *G06Q 20/401* (2013.01); *G06Q 20/202* (2013.01); *G06Q 20/325* (2013.01);
(Continued)

(58) Field of Classification Search
CPC .................................................. G08B 5/229
See application file for complete search history.

(56) References Cited

U.S. PATENT DOCUMENTS 6,062,472 A    5/2000 Cheung
6,647,272 B1   11/2003 Asikainen
(Continued)

FOREIGN PATENT DOCUMENTS

EP          1067492 A2    1/2001
KR    10-2000-0056045 A   9/2000
WO       2010/129257 A2   11/2010

OTHER PUBLICATIONS

International Search Report and Written Opinion dated Dec. 14, 2010 for Application No. PCT/US2010/032790, 9 pages.
(Continued)

*Primary Examiner* — A Hunter Wilder
(74) *Attorney, Agent, or Firm* — Kilpatrick Townsend & Stockton LLP

(57) ABSTRACT

A first embodiment of the present invention relates to systems and methods for determining a priority for a set of alert triggers and performing additional processing based on the determined priority. In some embodiments, additional processing may include generating and sending of alert messages. In other embodiments, additional processing may further include determining that the generating and sending of alert messages are to be delayed until a later time. In yet other embodiments, additional processing may include determining that no alert message is to be generated and sent. A second embodiment of the present invention relates to systems and methods for dynamically selecting a delivery channel and generating an alert message for the selected delivery channel. In some embodiments, the alert message may be formatted based on the selected delivery channel. According to one embodiment, the alert message may be generated based on a compact protocol format. When the alert message is received by a mobile device, the mobile (Continued)

device may use the alert message to generate a second alert message.

20 Claims, 7 Drawing Sheets

Related U.S. Application Data

(60) Provisional application No. 61/173,371, filed on Apr. 28, 2009.

(51) Int. Cl.

| | | |
|---|---|---|
| *G06Q 20/20* | (2012.01) | |
| *G06Q 30/00* | (2012.01) | |
| *G06Q 30/02* | (2012.01) | |
| *G06Q 50/26* | (2012.01) | |
| *H04L 12/18* | (2006.01) | |
| *H04L 29/08* | (2006.01) | |
| *G06Q 40/00* | (2012.01) | |
| *G06Q 20/32* | (2012.01) | |
| *G08B 25/00* | (2006.01) | |

(52) U.S. Cl.
CPC ......... *G06Q 20/40* (2013.01); *G06Q 30/0185* (2013.01); *G06Q 30/0224* (2013.01); *G06Q 30/0236* (2013.01); *G06Q 40/12* (2013.12); *G06Q 50/265* (2013.01); *G08B 5/229* (2013.01); *G08B 25/004* (2013.01); *H04L 12/1895* (2013.01); *H04L 67/04* (2013.01); *H04L 67/26* (2013.01); *H04L 67/306* (2013.01)

(56) References Cited

U.S. PATENT DOCUMENTS

| | | |
|---|---|---|
| 7,174,534 B2 | 2/2007 | Chong et al. |
| 7,370,004 B1 | 5/2008 | Patel et al. |
| 7,565,326 B2 | 7/2009 | Randle et al. |
| 7,568,222 B2 | 7/2009 | Randle et al. |
| 2002/0013711 A1 | 1/2002 | Ahuja et al. |
| 2002/0129354 A1 | 9/2002 | Bryan et al. |
| 2002/0133462 A1 | 9/2002 | Shteyn |
| 2004/0078340 A1 | 4/2004 | Evans |
| 2004/0203612 A1 | 10/2004 | Yum |
| 2004/0236859 A1 | 11/2004 | Geirr et al. |
| 2004/0254868 A1 | 12/2004 | Kirkland et al. |
| 2006/0059110 A1 | 3/2006 | Madhok et al. |
| 2006/0203835 A1 | 9/2006 | Bernstein et al. |
| 2007/0025270 A1 | 2/2007 | Sylvain |
| 2007/0094609 A1 | 4/2007 | Gilboa et al. |
| 2008/0094207 A1 | 4/2008 | Collins et al. |
| 2008/0097887 A1 | 4/2008 | Duquette et al. |
| 2008/0155560 A1 | 6/2008 | Iwamoto |
| 2008/0167990 A1 | 7/2008 | Grant |
| 2008/0183480 A1 | 7/2008 | Carlson |
| 2008/0200144 A1 | 8/2008 | Ginsberg |
| 2008/0205602 A1 | 8/2008 | Bishop |
| 2009/0015428 A1 | 1/2009 | Lemmon |
| 2009/0100141 A1 | 4/2009 | Kirkland et al. |
| 2009/0138563 A1 | 5/2009 | Zhu |
| 2010/0082750 A1 | 4/2010 | Kunz et al. |
| 2010/0274866 A1 | 10/2010 | Hammad et al. |
| 2011/0055013 A1 | 3/2011 | Hammad |

OTHER PUBLICATIONS

International Search Report and Written Opinion dated Nov. 16, 2010 for PCT/US2010/032518, 9 pages.

Notice of Acceptance dated Jul. 1, 2013 for Australian Patent Application No. 2010246236.

Office Action for Mexican Patent Application No. MX/a/2011/011409, with abbreviated letter from foreign associate dated May 27, 2013.

Office Action dated Oct. 17, 2013 for Canadian Patent Application No. 2,760,193, 3 pages.

Non-Final Office Action dated Nov. 15, 2011 for U.S. Appl. No. 12/764,715, 9 pages.

Notice of Allowance dated May 7, 2012 for U.S. Appl. No. 12/764,715, 13 pages.

Please Choose the Triggers you would like Enabled

| Enable | Trigger | Priority |
|---|---|---|
| ○ | Out of Country | 85 |
| ○ | ATM Use | 90 |
| ○ | Threshold Amount > 500 | 95 |
| ○ | Card Not Present or Online | 100 |

FIG. 5(a)

Please Choose the Triggers you would like Enabled

| Enable | Trigger | Priority |
|---|---|---|
| ⊙ | Out of Country | 100 |
| ⊙ | ATM Use | 95 |
| ⊙ | Threshold Amount > 500 | 90 |
| ○ | Card Not Present or Online | 85 |

FIG. 5(b)

ALERT PRIORITIZATION LOGIC

CROSS-REFERENCES TO RELATED APPLICATIONS

This application is a continuation of U.S. patent application Ser. No. 12/764,662 filed Apr. 21, 2010, which claims benefit under 35 U.S.C. § 119(e) of U.S. provisional patent application No. 61/173,371, entitled "Alerts Based System and Method," filed Apr. 28, 2009, the entire disclosures of which are incorporated herein by reference for all purposes.

BACKGROUND

There are many occasions where a user may want to be notified when his or her credit card is being used. For example, a user may want to receive an alert message regarding a recent transaction conducted out of the country, at an automated teller machine (ATM), or where the transaction exceeds a certain amount. When a transaction meets one of these criteria or alert triggers, the user may wish to have the resulting alert message sent to his or her mobile phone or email account.

In some situations, a user may want to receive an alert message differently based on the alert message's relative importance. For example, a user may make a minor gasoline purchase for $20. Because the purchase may be relatively unimportant, the user may wish to receive an alert message via email at the end of the day. The same user may also make a large electronics purchase for $1,000. Because the purchase may be relatively important, the user may want to receive a telephone call immediately following the purchase.

It would be desirable to improve upon existing alert messaging systems to make the delivery of alert messages more efficient and to optimize the use of system components in an alert messaging system.

Embodiments of the invention address these and other problems, individually and collectively.

BRIEF SUMMARY

Embodiments of the present invention disclosed herein include systems and methods for prioritizing alert triggers and performing additional processing based on the priority of the alert triggers. Embodiments of the present invention disclosed herein also include systems and methods for dynamically selecting a delivery channel and generating an alert message based on the selected delivery channel. Embodiments of the present invention can be implemented using one or more computer apparatuses and databases.

In one embodiment, transaction data associated with a transaction is received at a computer apparatus. The computer apparatus accesses a database comprising of one or more alert triggers. The computer apparatus then determines a set of alert triggers that applies to the transaction data. The computer apparatus subsequently determines a priority of the triggers in the set of alert triggers, and performs additional processing based on the priority.

In another embodiment, transaction data associated with a transaction is received at a computer apparatus. The computer apparatus accesses a database comprising of alert data including information related to one or more delivery channels. The computer apparatus then dynamically selects one or more delivery channels based on the alert data and a set of criteria. The computer apparatus subsequently generates an alert message based on the selected delivery channel.

One embodiment of the invention is directed to a system and method for performing a transaction with a portable consumer device and receiving a generated alert message.

Another embodiment of the invention is directed to an enrollment process that a user undertakes to subscribe to a messaging service provided by embodiments of the present invention.

Yet another embodiment of the invention is directed to a system and method for prioritizing alert triggers. As an illustration, a user may access a web site and prioritize alert triggers based on the user's preferences. For example, a user may be provided with a list of four triggers. The user may subsequently rank the alert triggers. Embodiments may later use this list of prioritized alert triggers in performing processing, such as determining if an alert message is to be sent in real-time.

These and other details regarding embodiments of the invention are provided below.

BRIEF DESCRIPTION OF THE DRAWINGS

FIG. 5(a) shows an alert triggers selection and prioritization interface prior to configuration, according to a first embodiment of the invention.

FIG. 5(b) shows an alert triggers selection and prioritization interface after configuration, according to a first embodiment of the invention.

DETAILED DESCRIPTION

Figure 1:
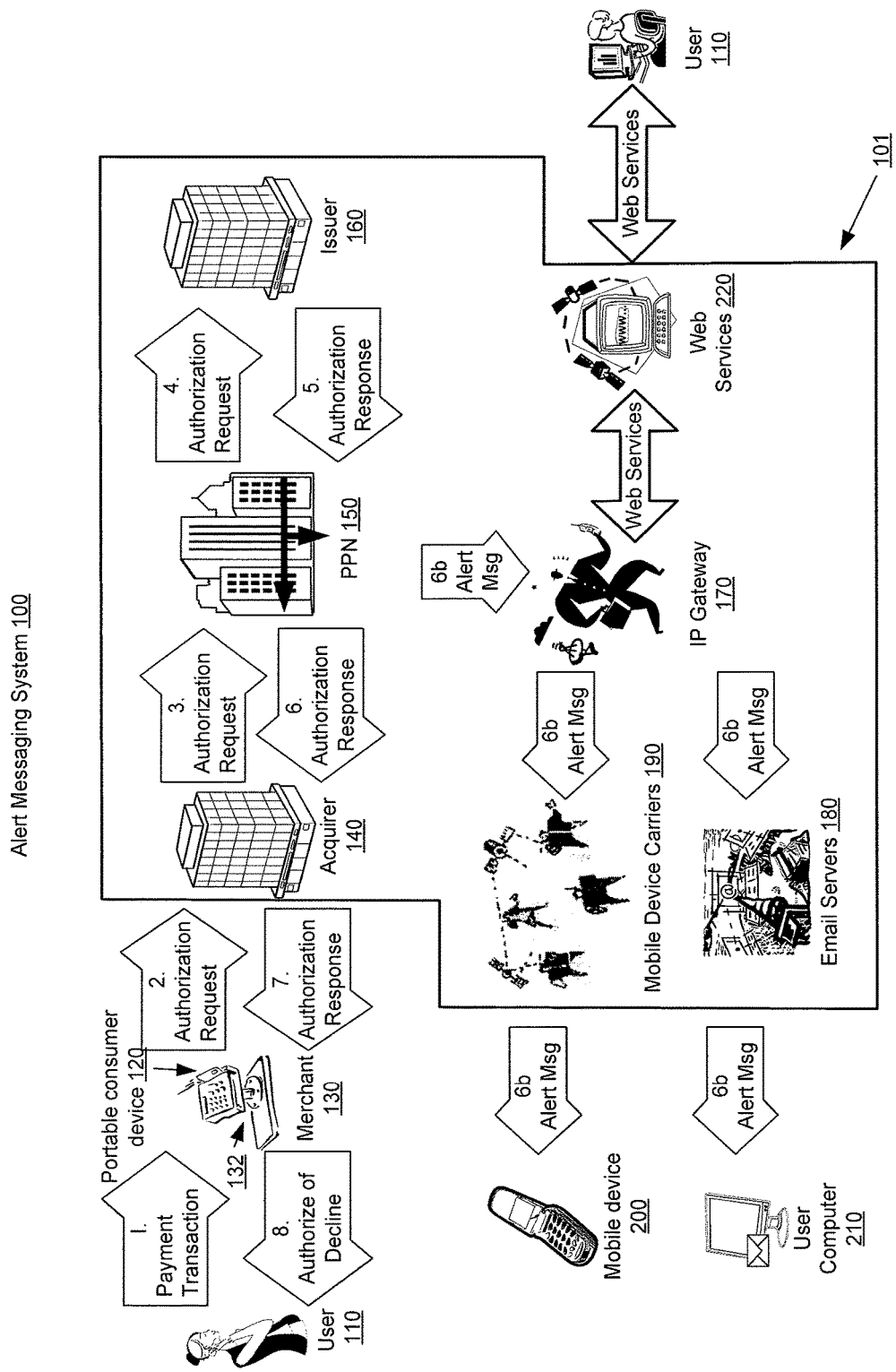
FIG. 1 shows an alerts messaging system, according to an embodiment of the invention.

Embodiments of the invention are directed to a system and method for prioritizing alert triggers and performing processing based on the priority of the alert triggers. Embodiments are also directed to a system and method for dynamically selecting a delivery channel and generating an alert message based on the selected delivery channel.

According to a first embodiment, the method comprises receiving transaction data for a transaction. The transaction data may be present in an authorization request message. For example, a user can conduct a transaction using a portable consumer device such as a credit card. The authorization request message comprising the transaction data is sent to an acquirer, and then to a payment processing network. The payment processing network then determines if the user is enrolled to receive alert messages. If the user is enrolled, then the transaction data, which may include data elements such as account information and merchant data, is sent to an Internet protocol (IP) gateway. The IP gateway subsequently receives the transaction data.

Upon receiving the transaction data from the payment processing network, a notification server computer in the IP gateway accesses a database, which can comprise alert data. Alert data may be provided by the user, an issuer, a payment processing network, or any combination thereof. The alert data may include information that may be used to select one or more alert triggers. The one or more alert triggers may be based on transaction threshold amounts, ATM usage, out of country transactions, card not present or online transactions, credits or refunds, cash back earned transactions, recurring payments, declined transactions, fuel purchases, restaurant purchases (including quick service or formal), travel related purchases (such as lodging, car rental, and ticket purchase transactions), and the like. The alert data may also include priority information for the one or more alert triggers.

The notification server computer may check each selected alert trigger against the transaction data received from the payment processing network. Through checking each selected alert trigger, the notification server computer may determine a set of alert triggers that applies to the transaction. The notification server computer may then determine a priority for the set of alert triggers based on the alert data.

Subsequently, the notification server computer may perform additional processing. Illustratively, the notification server computer may use the priority to select one or more delivery channels. For example, the notification server computer may determine, based on the priority, that an alert message is to be sent to a user's mobile phone via short message service (SMS). The notification server computer may also format and generate one or more alert messages based on the priority. In some embodiments, the notification server computer may suppress the generation and sending of one or more alert messages until a later time. In further embodiments, the notification server computer may determine that one or more alert messages are not to be sent at all.

Relative to conventional messaging services, embodiments of the present invention provide various advantages. In particular, embodiments can effectively reduce the number of redundant alert messages while also improving communication with users. For instance, in situations where multiple alert triggers apply to a single transaction, conventional messaging services may transmit multiple alert messages reporting on the same transaction. Receiving several messages at once, however, is often annoying to users. As an alternative, messaging services could blindly send a single alert message. However, doing so may cause an associated reduction in the likelihood that the user is effectively notified. For example, a messaging service may deliver a single alert message regarding an important $1,000 ATM transaction to a user's rarely accessed email account. In such a case, the user may not be notified about the relatively important transaction until days later.

In contrast, by determining a priority for alert triggers, embodiments of the invention can send fewer alert messages while at the same time allowing for effective communication with users. In particular, the priority may be used to intelligently generate a message including all necessary information. Embodiments may also use the priority to effectively send an alert message in a manner that matches the relative importance of a transaction. For example, a message regarding a relatively unimportant $10 transaction may be sent to a user's rarely accessed email account at the end of a day. A message regarding a relatively important $1,000 transaction may be sent to a user's more frequently checked mobile phone via SMS. In some embodiments, with the exception of providing priority information (in cases where the user supplies the priority information), the intelligent generation and routing of messages may be performed without specific input from the user.

According to a second embodiment, the method comprises receiving transaction data for a transaction. The transaction data may be present in an authorization request message. For example, a user can conduct a transaction using a portable consumer device such as a credit card. The authorization request message comprising the transaction data is sent to an acquirer, and then to a payment processing network. The payment processing network then determines if the user is enrolled to receive alert messages. If the user is enrolled, then the transaction data, which may include data elements such as account information and merchant data, is sent to an Internet protocol (IP) gateway. The IP gateway subsequently receives the transaction data.

Upon receiving the transaction data from the payment processing network, a notification server computer in the IP gateway accesses a database, which can comprise of alert data. Alert data may be provided by the user, an issuer, a payment processing network, or any combination thereof. The alert data may include delivery channel information, such as mobile phone numbers, web service identifiers (such as user names), and the like.

After accessing the database, the notification server computer may determine if one or more alert triggers apply to the transaction data. If at least one trigger applies to the transaction data, the notification server computer dynamically selects one or more delivery channels. The notification server computer may dynamically select each channel based on reach-ability and cost criteria. The selection of the channels may be performed by the notification sever computer without user initiated configuration of the criteria. The notification server computer may thereafter generate an alert message based on each selected delivery channel. In particular, each generated alert message may adhere to the technical requirements and/or features of its associated delivery channel. Additionally, the level of detail provided by each alert message may vary depending on the delivery channel.

Relative to conventional systems, embodiments of the present invention reduce alert message delivery costs and improve communication with users. Embodiments also decrease the amount of alerts configuration required by the user. More specifically, embodiments can select delivery channels in a manner that reduces costs for all entities. Embodiments may further improve user communication by identifying the channels that may be used to immediately reach a user. In addition to the aforementioned advantages, embodiments also allow users to receive alert messages without needing to configure the system. For instance, a user interested in reducing delivery costs does not need to configure each of his or her low priority alert messages to be sent via a low cost delivery channel. Instead, embodiments would dynamically identify and select a suitable low cost delivery channel at the time of message delivery.

Other specific examples of embodiments of the invention are described in further detail below.

I. System

FIG. 1 is a diagram illustrating an alerts messaging system 100, in accordance with an embodiment of the invention. The alerts messaging system 100 includes a user 110, a portable consumer device 120, a merchant 130, an access device 132, an acquirer 140, a payment processing network 150, an issuer 160, an IP Gateway 170, mobile device carriers 190, e-mail servers 180, a mobile device 200, a user computer 210, and web services 220. Although one user 110, one mobile device 200, one user computer 210, one merchant 130, one acquirer 140, and one issuer 160 are shown, there may be any suitable number of any of these entities in the alerts messaging system 100.

User 110 is in operative communication with the portable consumer device 120. Merchant 130 has an access device 132 for interacting with the consumer portable device 120 and acquirer 140 associated with merchant 130. Acquirer 140 is in communication with issuer 160 through payment processing network 150.

The alerts messaging system 100 also includes a mobile device 200 in operative communication with user 110 for displaying alert messages to the user 110.

The alerts messaging system 100 also includes an IP Gateway 170 that is in communication with payment processing network 150. IP Gateway 170 receives the transaction data from payment processing network 150, and subsequently processes the transaction data. IP Gateway 170 is also in communication with the mobile device carriers 190, e-mail servers 180, and web services 220. The mobile device carriers 190 are in operative communication with the mobile device 200, and the mail servers 180 are in operative communication with the user computer 210. The alert messages that are generated from IP Gateway 170 are sent to the mobile device carriers 190 and/or mail servers 180 to be sent to the mobile device 200, and/or to be accessed by the user computer 210. The web services 220 are also in operative communication with the user 110 for enrolling the user 110 in the messaging service provided by the alerts messaging system 100.

Each of the components shown in FIG. 1 are described in further detail below.

Figure 2:
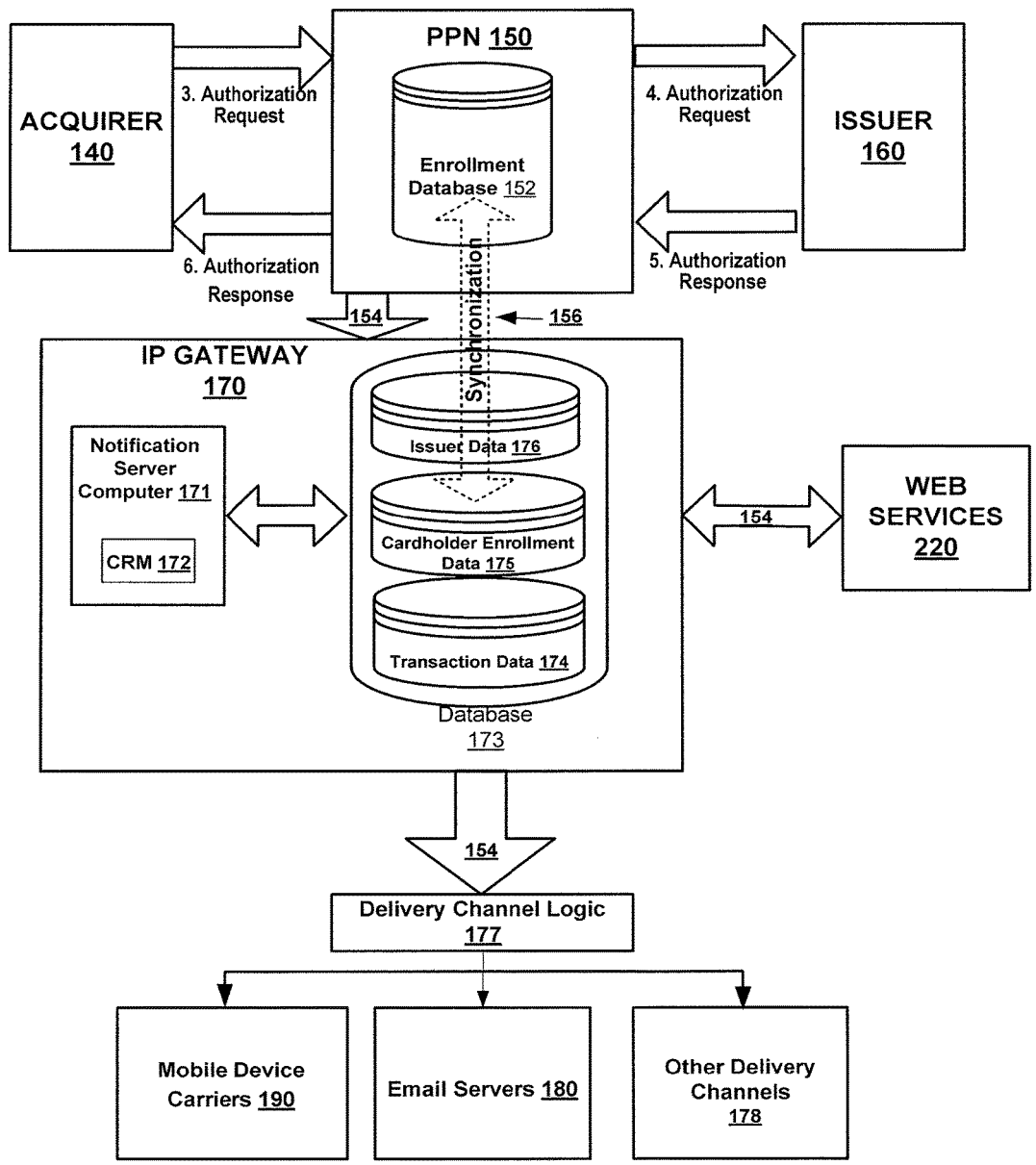
FIG. 2 shows a subset of the alerts messaging system, according to an embodiment of the invention.

FIG. 2 is a diagram illustrating a subsystem 101 of the alerts messaging system 100. FIG. 2 illustrates more details about the IP Gateway 170. The IP Gateway 170 includes a notification server computer 171 having a computer-readable medium (CRM) 172, and a processor (not shown) that is coupled to the CRM 172. Although one CRM 172 is shown in FIG. 2, the notification server computer 171 may house more than one CRM as needed. The notification server computer 171 is in communication with database 173. In some embodiments, database 173 may be included in the notification server computer 171. Database 173 contains alert data. The alert data includes transaction data 174, cardholder enrollment data 175, and issuer data 176. Cardholder enrollment data 175 is synchronized with the enrollment database 152 via the synchronization link 156. The enrollment database 152 contains data related to users who are enrolled in the messaging service. Data related to users include one or more sets of alert triggers. Data may also include delivery channel information.

As shown in FIG. 2, IP Gateway 170 is in communication with payment processing network 150, and web services 220 via the network connection 154 which may be in any suitable form. The network connection 154 may include, for example, at least a portion of the Internet. Delivery channel logic 177 is in communication with IP Gateway 170, mobile service carriers 190, e-mail servers 180, and other delivery channels 178.

Merchant 130 refers to any suitable entity or entities that make a transaction with user 110. Merchant 130 may use any suitable method to make the transaction. For example, merchant 130 may use an e-commerce business to allow the transaction to be conducted by merchant 130 through the Internet. Other examples of merchant 130 include a department store, a gas station, a drug store, a grocery store, or other suitable business.

Access device 132 may be any suitable device for communicating with merchant 130 and for interacting with portable consumer device 120. Access device 132 can be in any suitable location such as at the same location as merchant 130. Access device 132 may be in any suitable form. Some examples of access devices 132 include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. Access device 132 may use any suitable contact or contactless mode of operation to send or receive data from portable consumer devices 120.

If access device 132 is a POS terminal, any suitable POS terminal may be used and may include a reader, a processor, and a computer-readable medium. Reader may include any suitable contact or contactless mode of operation. For example, exemplary card readers can include radio frequency (RF) antennas, optical scanners, bar code readers, magnetic stripe readers, etc. to interact with portable consumer device 120.

Acquirer 140 refers to any suitable entity that has an account with merchant 130. In some embodiments, issuer 160 may also be acquirer 140.

Payment processing network 150 refers to a network of suitable entities that have information related to an account associated with portable consumer device 120. This information includes data associated with the account on portable consumer device 120 such as profile information, data, and other suitable information.

Payment processing network 150 may have or operate a server computer and may include a database. The database may include any hardware, software, firmware, or combination of the preceding for storing and facilitating retrieval of information. Also, the database may use any of a variety of data structures, arrangements, and compilations to store and facilitate retrieval of information. The server computer may be coupled to the database and may include any hardware, software, other logic, or combination of the preceding for servicing the requests from one or more client computers. Server computer may use any of a variety of computing structures, arrangements, and compilations for servicing the requests from one or more client computers.

Payment processing network 150 may include data processing subsystems, networks, and operations used to support and deliver authorization services, exception file services, and clearing and settlement services. An exemplary payment processing network 150 may be VisaNet™. Networks that include VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. Payment processing network 150 may use any suitable wired or wireless network, including the Internet.

Issuer 160 refers to any suitable entity that may open and maintain an account associated with portable consumer device 120 for user 110. Some examples of issuers may be a bank, a business entity such as a retail store, or a governmental entity. In many cases, issuer 160 may also issue portable consumer device 120 associated with the account to user 110.

IP Gateway 170 refers to an entity that processes transaction data and alerts triggers. IP Gateway 170 may additionally generate and send alert messages. IP gateway 170 may include one or more servers and databases for generation of the intelligent alert messages and retrieval of data. IP Gateway 170 may be part of the payment processing network 150 or may be a separate entity in communication with payment processing network 150.

Notification server computer 171 may be a powerful computer or cluster of computers. For example, the server computer can be a large mainframe, a minicomputer cluster, or a group of servers functioning as a unit. In one example, the notification server computer may be a database server coupled to a Web server. Notification server computer 171 includes a computer-readable medium (CRM) 172 and a processor (not shown) coupled to the CRM 172.

Database 173 may be in the form of one or more server computers for storage of data. It may also be in the form of one or more electronic storage units (stand alone hard drives) capable of storing electronic data.

Delivery channel logic 177 may be in the form of an application program that sends the intelligent alert messages to the appropriate delivery channels. The delivery channel logic 177 may be part of the IP gateway 170 or the payment processing network 150. The delivery channel logic 177 may run on the notification server computer 171 or may run on a delivery channel logic server computer (not shown). The delivery channel logic server computer may include a computer-readable medium (CRM), and a processor that is coupled to the CRM (both not shown). The delivery channel logic server computer may be in communication with the notification server computer 171. In some embodiments, the delivery channel logic server computer may be a powerful computer or cluster of computers. In some embodiments, a database (not shown) is included in the delivery channel logic server computer. The database may contain alert data. The alert data may include transaction data 174, cardholder enrollment data 175, and issuer data 176. The alert data may be received from the notification server computer 171.

E-mail servers 180 are server computers configured to receive an e-mail from a network connection and store the e-mail in memory for future retrieval.

Mobile device carriers 190 refer to entities that provide wireless infrastructures for wireless data transfer and communication via cellular phone or other mobile devices. Examples of such entities include AT&T™, Verizon Wireless™, T-Mobile™, etc.

Figure 3:
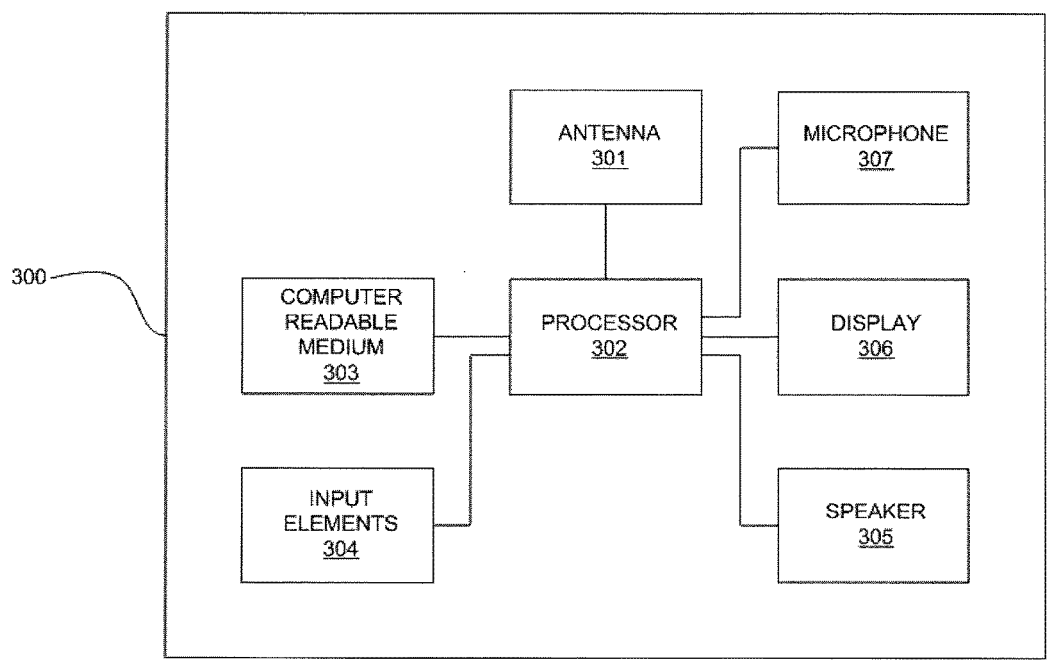
FIG. 3 shows an exemplary mobile device, according to an embodiment of the invention.

Mobile device 200 may be in any suitable form. For example, mobile device 200 can be hand-held and compact so that it can fit into a consumer's wallet and/or pocket (e.g., pocket-sized). Some examples of mobile device 200 include desktop or laptop computers, cellular phones, personal digital assistants (PDAs), pagers, payment cards, security cards, access cards, smart media, transponders, and the like. In some embodiments, mobile device 200 and portable consumer device 120 are embodied in the same device. FIG. 3 shows an exemplary mobile device 300. The mobile device 300 may include a computer-readable medium 303 (CRM) and a processor 302 that is coupled to the CRM. The mobile device 200 may further include an interpretative messaging engine for processing compact protocol formatted messages (not shown). The interpretative messaging engine may be embodied on the CRM.

User computer 210 may be a personal computer or a laptop. The User computer 210 may run an operating system such as Microsoft Windows™ and may have a suitable browser such as Internet Explorer™.

Web services 220 may be in the form of a server and a website which allows users to enroll in the messaging service. Web services 220 may be provided by the issuer 160 or the payment processing network 150. Web services 220 may additionally be provided by third party services such as Facebook™, Skype™, and America Online™.

User Devices may include mobile device 200, user computer 210, and the like.

II. Method

A. Prioritization Methods

Methods according to embodiments of the invention can use any suitable type of alert triggers and can prioritize alert triggers in any suitable manner. Exemplary alert triggers can be based on transaction value (e.g., a purchase made over a predetermined threshold), a transaction type (e.g., online or fee incurring), a geographic location (e.g., out of the United States), time of day (e.g., only during the day), by merchant type (e.g., only provide alerts when purchases are made at electronics stores), etc.

Alert trigger prioritization can also occur in any suitable manner. Exemplary prioritizations may include where location based triggers (such as the out of country trigger) take precedence over other triggers, triggers more inclined to indicate security problems (such as fraud) take precedence over other triggers, triggers indicating transactions with high monetary values take precedence over other triggers, triggers indicating transactions with particular merchants take precedence over other transactions, triggers indicating an online or card not present transaction take precedence over other triggers, triggers provided and/or configured by the issuer 160 take precedence over other triggers, triggers provided and/or configured by the payment processing network 150 take precedence over other triggers, triggers indicating transactions initiated with certain user devices take precedence over other triggers, triggers with high risk profiles take precedence over other triggers, triggers where users incur associated transaction fees (such as ATM or international transaction fees) may take precedence over other triggers, monetary threshold triggers may take precedence over other triggers, etc. It should also be appreciated that prioritization may also occur using any combination of the above. For example, in a group of three triggers, an out of country trigger may have the highest priority. An online or card not present trigger may have the next highest priority. Lastly, an ATM use trigger may have the lowest priority.

Figure 4:
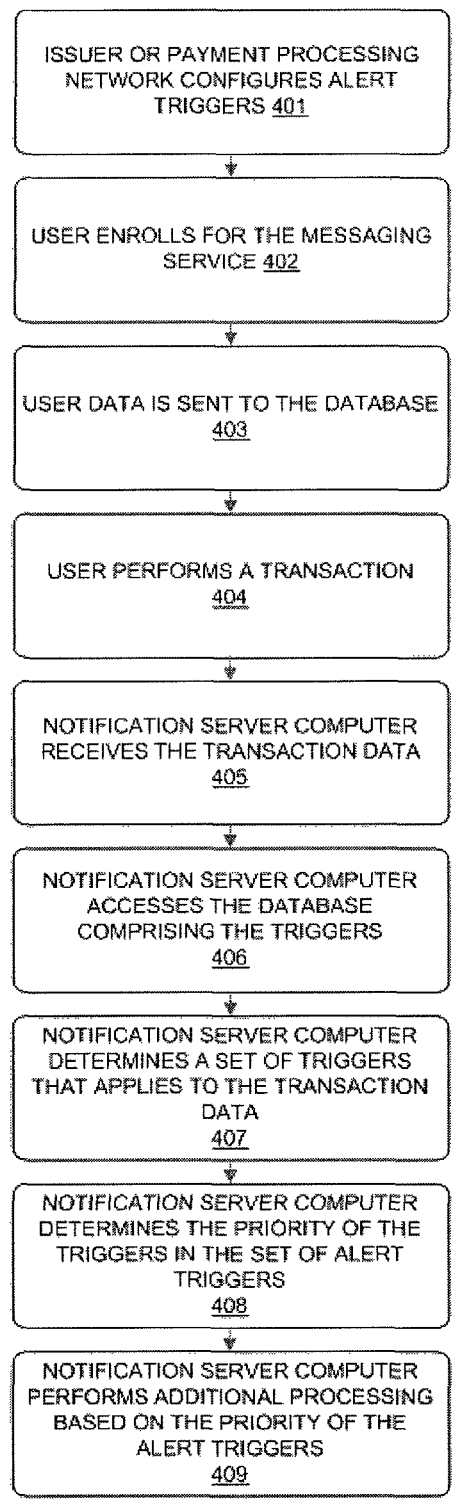
FIG. 4 shows a flowchart illustrating the steps involved in processing alert triggers and transaction data, according to a first embodiment of the invention.

FIG. 4 is a flowchart of a first embodiment that illustrates the process from configuration of the alert triggers to processing of alert triggers and transaction data. As shown in FIG. 4, the issuer 160 or payment processing network 150 initially configures the alert triggers (step 401). Next, the user 110 enrolls in the messaging service provided by the alerts messaging system 100 (step 402). The user data that the user 110 provides during the enrollment process is then sent to the database 173 and incorporated with alert data (step 403). The user 110 then performs a transaction using the consumer portable device 120 (step 404). Next, the IP Gateway 170 receives the transaction data 174 from the payment processing network 150 (step 405). After receiving the transaction data 174, the notification server computer 171 in the IP Gateway 170 accesses the database 173 that contains the alert data (step 406). The alert data includes one or more alert triggers. The notification server computer 171 then determines a set of the one or more alert triggers that applies to the transaction based on the transaction data 174 (steps 407). Next, the notification server computer 171 determines the priority of the set of alert triggers (step 408). Finally, the notification server computer 171 performs additional processing based on the priority of the set of alert triggers (step 409).

1. Initial Configuration and Prioritization of the Alert Triggers

In some embodiments, the issuer 160 and/or the payment processing network 150 may configure and prioritize (step 401 in FIG. 4) the alert triggers prior to the user 110 enrolling in the messaging service provided by the alerts messaging system 100. In particular, the issuer 160 and/or the payment processing network 150 may enable certain alert triggers and remove or disable other alert triggers. The issuer 160 and/or the payment processing network 150 may additionally set a priority for the alert triggers. In particular, embodiments may provide a list of alert triggers. The list of triggers may be presented in a configuration interface. The alert triggers in the list may be prioritized using the interface by the issuer 160 and/or the payment processing network 150. In some embodiments, the list may include priority values associated with each alert trigger. The priority values may be used to indicate the priority of the alert triggers. In one embodiment, alert triggers associated with higher priority values may have higher priority. In another embodiment, alert triggers associated with lower priority values may have higher priority.

In certain embodiments, the issuer 160 and/or the payment processing network 150 may associate certain categories of alert triggers or ranges of priority values with certain behavior. For instance, alert messages associated with alert triggers with priority values between 0-20 may not be sent until the end of the day.

In certain embodiments, the list of alert triggers may be a sliding scale. In some embodiments, the list may include open slots or unassigned priority values between alert triggers. For example, an alert trigger with the highest priority value in the list may be assigned a value of 50. The alert trigger with the next highest priority value may be assigned a value of 30. As a result, there would be 19 unassigned priority values between the alert triggers. Open slots or unassigned priority values may be used for alert triggers that may be added in the future. For instance, a newly added alert trigger may be assigned a priority value of 35.

The configuration and prioritization set by issuer 160 and/or payment processing network 150 may define the default alert triggers settings for the user 110 at the time the user 110 enrolls in the messaging service. The issuer 160 and/or payment processing network 150 may restrict the extent to which the user 110 may configure and prioritize the alert triggers. For example, the issuer 160 may restrict the user 110 from configuring a transaction amount alert trigger to have a threshold below $20. The issuer 160 may further prevent the user 110 from making modifications to the priority of the alert triggers and from disabling certain alert triggers. In certain embodiments, the issuer 160 and/or the payment processing network 150 may configure and prioritize alert triggers at any time including after the user 110 has enrolled in the system.

In certain embodiments, the invention may automatically configure and prioritize the alert triggers comprising the database 173. Embodiments may determine the priority of the alert triggers based on certain criteria, such as the relative risk of each alert trigger.

In some embodiments, the alert triggers and their associated configuration and prioritization information may be stored in database 173 as alert data, which is used by the notification server computer 171 and/or delivery channel logic 177.

2. Enrollment

In some embodiments of the present invention, the user 110 may enroll for the messaging service (step 402 in FIG. 4) provided by the alerts messaging system 100 through multiple ways. In some embodiments, the user 110 may be enrolled automatically by the issuer 160 that issues the portable consumer device 120. Enrollment may be done in a batch mode, by file delivery from issuer 160 or by file delivery from some other party. In other embodiments, the issuer 160 or the payment processing network 150 may provide the messaging service as an option to the user 110 at which time the user 110 may enroll in the messaging service either by contacting a customer service representative over the phone (provided either by the issuer 160 or payment processing network 150), or by accessing a web site and filling out an online application. In certain implementations, the web site may be hosted by one entity but can redirect the user 110 to a site hosted by another entity.

During the enrollment process, the user 110 provides information that will be used by the alerts messaging system 100 during the processing of the transaction data 174. The user 110 may provide the information to the alerts messaging system 100. This may occur either by accessing a website and filling out an online application or by contacting a customer service representative (e.g., using the phone). The user 110 may later access the web site or contact the issuer 160 to change the information provided at any time.

Information provided by the user 110 may include delivery channel information. In particular, the user 110 may provide information including web service identifiers (such as account user names), mobile phone numbers, voice over IP service account identifiers, email addresses, and the like. The user 110 may additionally provide service plan information such as mobile device voice and data plans. The user 110 may further provide user device characteristics information such as make and model information.

The user 110 may additionally provide information about the alert triggers he or she wants to be enabled or have checked when a transaction is received by the alerts messaging system 100. The user 110 may further provide information regarding the delivery channels or delivery methods for particular alert triggers. For example, the user 110 may specify that when an out of country alert trigger applies to a transaction, an alert message is to be sent to his or her email account. The user 110 may also configure alert trigger settings to delay or prevent the generation and sending of certain alert triggers.

The user 110 may further provide information regarding the priority of the alert triggers. FIGS. 5(*a*) and 5(*b*) show a selection and prioritization interface presented to the user 110.

Referring to FIGS. 5(*a*) and 5(*b*), embodiments of the invention may provide the user 110 with an interface including a list of alert triggers. For instance, FIG. 5(*a*) shows a list including four alert triggers: ATM use, out of country, transaction amount greater than 500, and card not present or online. The user 110 may select, from the list, the triggers he or she wants to have enabled. As mentioned, enabling an alert trigger causes the alerts messaging system 100 to determine if the trigger applies to transactions received by the system. For example, if the user 110 enables the out of country alert trigger, that trigger is checked by the alerts messaging system 100 when the user 110 performs a transaction. In certain circumstances, the user 110 may, as part of enabling a trigger, input additional trigger parameters. For example, the user 110 may input a threshold value, such as $500, for the transaction amount trigger.

In addition to enabling alert triggers, the user 110 may prioritize the alert triggers. In particular, embodiments of the invention may include priority values, which are assigned to each alert trigger. In some embodiments, each alert trigger may be assigned a default priority value. Priority values may take the form of any suitable value capable of effectuating an ordering scheme. For example, priority values may be numbers or letters. In certain embodiments, an ordering scheme may specify that alert triggers with higher values have higher priority. For instance, referring to FIG. 5(a), the ATM use trigger has a priority value of 90, which is higher than the out of country trigger's priority value of 85. As a result the ATM use trigger has a higher priority than the out of country trigger. In other embodiments, an ordering scheme may specify that alert triggers with lower values have higher priority.

To prioritize the alert triggers, some embodiments may permit the user 110 to input and/or change the priority value for each alert trigger. In some embodiments, the invention may provide a free form HTML text field for the user 110 to enter in new priority values. FIG. 5(a) shows an example of the alert trigger list prior to the user 110 entering in new priority values. FIG. 5(b) shows the list after the user 110 has entered in new priority values.

In certain embodiments, the user 110 may associate certain categories of alert triggers or ranges of priority values with certain behavior. For instance, alert messages associated with alert triggers related to transaction amounts may not be sent until the end of the day.

The information that the user 110 provides, including any enabled alert triggers, priority information and/or the alerts trigger list, is stored in the database 173 in the form of cardholder enrollment data 175. This is shown as step 403 in FIG. 4. This data, in addition to the transaction data 174 and issuer data 176, comprises the alert data, which is used by the notification server computer 171 and/or delivery channel logic 177.

3. Performing a Transaction

FIG. 1 illustrates a process involved in performing a transaction according to an embodiment of the invention. This is shown as step 404 in FIG. 4. In a typical purchase transaction, the user 110 purchases goods or services at the merchant 130 using the portable consumer device 120 (arrow 1 in FIG. 1). An authorization request message comprising transaction data is generated by a processor in the access device 132 after the portable consumer device 120 interacts with the access device 132. The authorization request message may comprise, for example, the BIN (bank identification number) and expiration date associated with the portable consumer device 120, the purchase amount, and a merchant code such as a merchant category code (MCC). The authorization request message is then forwarded from the merchant 130 to the acquirer 140 (arrow 2 in FIG. 1). After receiving the authorization request message, it is then sent to the payment processing network 150 (arrow 3 in FIG. 1).

The payment processing network 150 then forwards the authorization request message to the issuer 160 of the portable consumer device 120 (arrow 4 in FIG. 1). After the issuer 160 receives the authorization request message, the issuer 160 sends an authorization response message back to the payment processing network 150 to indicate whether or not the current transaction is authorized (or not authorized) (arrow 5 in FIG. 1).

After the payment processing network 150 receives the authorization response message, it then forwards the authorization response message back to the acquirer 140 (arrow 6 in FIG. 1). The acquirer 140 then sends the response message back to the merchant 130 (arrow 7 in FIG. 1), and it is then presented to the user 110 (arrow 8 in FIG. 1).

If the user 110 is enrolled in the messaging service, the payment processing network 150 sends the transaction data to the IP Gateway 170 (arrow 6b in FIG. 1). In order for the payment processing network 150 to determine whether the authorization request is associated with a portable consumer device 120 that is enrolled in the messaging service, the payment processing network 150 maintains a list of account numbers associated with users who are enrolled in the messaging service in the enrollment database 152. The data in the enrollment database 152 are synchronized with the appropriate portion(s) of the cardholder enrollment data 175 via synchronization link 156 which may be in any suitable form. For example, the synchronization link 156 may be in the form of local area network connection or Internet.

After the payment processing network 150 receives an authorization response from the issuer 160, an application program, running on a computer (not shown) in payment processing network 150, compares the account number associated with the authorization request (or the authorization response) with a list of enrolled account numbers in the enrollment database 152. If there is a match indicating that the account number associated with portable consumer device 120 is enrolled in the messaging service, the payment processing network 150 sends the transaction data 174 associated with that particular transaction to the IP Gateway 170.

4. Processing Transaction Data

After the IP gateway 170 receives the transaction data 174 from the payment processing network 150 (step 405 in FIG. 4), the notification server computer 171 begins processing the transaction data 174. During this process, normal processing for transaction authorization continues as normal with the issuer 160.

In one embodiment, the IP gateway 170 may be part of the payment processing network 150. In other embodiments, the IP gateway 170 may be a third party entity in communication with the payment processing network 150 that receives and processes the transaction data 174. In other embodiments, after the transaction data 174 is received from the payment processing network 150, the notification server computer 171 begins processing the transaction data 174. In one embodiment, the transaction data 174 may be stored in database 173, which is then accessed by the notification server computer 171, along with cardholder enrollment data 175 and/or issuer data 176, for processing. In other embodiments, the transaction data 174 may be sent directly to the notification server computer 171.

The transaction data 174 received from the payment processing network 150 may contain information such as an account number associated with the portable consumer device 120, name of the merchant 130 (or other merchant identifier such as a merchant category code or MCC) and the amount of the transaction. The transaction data 174 may also contain other information such as the location of the merchant 130. In some embodiments, the transaction data 174 may not contain all of the information needed to identify some aspect of the transaction such as the location of the merchant 130. However, the transaction data 174 may contain processing codes and reference numbers that may be used to acquire further needed information regarding a transaction.

5. Determining Alert Triggers that Apply to the Transaction Data

In certain embodiments, the notification server computer 171 may determine a set of alert triggers that applies to the transaction data 174 (step 407 in FIG. 4). In order to make this determination, the notification server computer 171 accesses alert data from the database 173 (step 406 in FIG. 4). The notification server computer 171 then selects one or more alert triggers from using the alert data, which may comprise of the cardholder enrollment data 175 and/or issuer data 176 (step 406 in FIG. 4). For example, the notification server computer 171 may select the ATM use, out of country, and transaction amount triggers based on the cardholder enrollment data 175. This information may have been previously inputted by the user 110 during, for example, the enrollment process.

Upon selecting the one or more alert triggers, a processor (which executes code on a computer readable medium) in the notification server computer 171 examines each alert trigger in the set against the particular data elements comprising the transaction data 174. For instance, an out of country trigger may be compared against the merchant location information of transaction data 174. If the merchant location of the transaction is, for instance, in France, the notification server computer 171 will determine that the out of country trigger applies to the transaction data 174. Likewise, a transaction amount trigger may be compared against the amount information of the transaction data 174. If the amount information exceeds the set transaction amount threshold, the notification server computer 171 will determine that the transaction amount trigger additionally applies to the transaction.

By examining each selected alert trigger, the notification server computer 171 can determine a set of alert triggers that applies to the transaction data 174. Examination of the alert triggers may be performed either sequentially or in parallel.

6. Determining Priority of the Alert Triggers

In certain embodiments, a processor (which executes code on a computer readable medium) in the notification server computer 171 may determine a priority for the set of alert triggers that applies to the transaction data 174 (step 408 in FIG. 4). In certain embodiments, the notification server computer 171 is configured to determine priority based on alert data, which may include cardholder enrollment data 175 and/or issuer data 176. For example, issuer data 176 may include a default priority for all the alert triggers comprising database 173. The card enrollment data 175 may also include priority information previously inputted by the user 110.

In certain embodiments, the notification server computer 171 may determine priority based on the priority values associated with each trigger in the set. In particular, the notification server computer 171 may determine that alert triggers with higher priority values have higher priority. For example, an out of country trigger may be associated with a priority value of 95. An ATM use trigger may be associated with a priority value of 85. The notification server computer 171 may determine that the out of country trigger has a higher priority than the ATM use trigger because the former is associated with a higher priority value. In another example, the notification server computer 171 may determine that alert triggers associated with lower priority values have higher priority. For example, an out of country trigger may be associated with a priority value of 1. An ATM use trigger may be associated with a priority value of 2. The notification server computer 171 may determine that the out of country trigger has a higher priority than the ATM use trigger because the former is associated with a lower priority value.

7. Performing Additional Processing

In certain embodiments, the notification server computer 171 may perform additional processing based on the priority of the set of alert triggers that applies to the transaction data 174 (step 409 in FIG. 4). Additional processing may include selecting one or more alert message templates, generating one or more alert messages, sending one or more alert messages and/or data to the delivery channel logic 177 for delivery to the user 110, and suppressing or preventing the generation and sending of alert messages.

a. Selecting Delivery Channels Based on Priority

In certain embodiments, the notification server computer 171 may determine one or more delivery channels through which alert messages are to be sent to the user 110. In some embodiments, the notification server computer 171 may use alert data to select delivery channels that are associated with the alert trigger with the highest priority in the set of alert triggers that applies to the transaction data 174. For example, the notification server computer 171 may have previously determined that an out of country trigger has the highest priority in a set. The notification server computer 171 may use alert data to determine that the user 110 had previously elected to receive alert messages for out of country transactions through both SMS and email. As a result, the notification server computer 171 selects SMS and email as delivery channels.

b. Generating Alert Messages Based on Priority

In some embodiments, the notification server computer 171 may generate one or more alert messages based on the alert trigger with the highest priority.

The generation of alert messages may be performed by a processor using a software application stored in the CRM 172 that is running on the notification server computer 171. The combination of such a software application and the notification server computer 171 may be referred to (in some cases) as an "alerts rule engine." In one embodiment, there may be more than one software application running on the notification server computer 171 and working in concert to access various resources such as database 173 to generate the alert messages. In another embodiment, some functions may be performed by an Application Specific Integrated Circuit (ASIC) that may be part of the notification server computer. In some other embodiments, the alert messages may be generated by the combination of software applications and ASICs.

Various tables of different specific messages or alert message templates may be used to generate alert messages. To generate an alert message, the notification server computer 171 may select one or more alert message templates.

In certain embodiments, the notification server computer 171 may automatically select one or more alert message templates based on the alert trigger with the highest priority in the set of triggers that applies to the transaction data 174. The notification server computer 171 may then insert certain data elements comprising the transaction data 174 into the templates to generate alert messages. For example, an alert message template for an out of country trigger may read "Your card was used out of the country in X." The notification server computer 171 may replace X with the location information comprising the transaction data 174.

In some embodiments, the notification server computer 171 may additionally include, in the alert message, transaction data elements not directly related to the alert trigger with the highest priority. For instance, if the out of country trigger has the highest priority, the alert message may nonetheless include a transaction amount in addition to location information. Illustratively, the alert message may read "Your card was used out of the country in Paris for $10." In certain embodiments, the notification server computer 171 may incorporate, into the alert message, content for each trigger in the set of triggers that applies to the transaction data 174. For instance, the notification server computer 171 may include, in an alert message, that a transaction occurred at an ATM even where the ATM use trigger is not the alert trigger with the highest priority. More specifically, an alert message may read "Your card was used out of the country in Paris at an ATM." Here, the alert message discloses to the user 110 that a transaction applies to the out of country trigger. The alert message additionally includes information related to the ATM use trigger. In certain embodiments, the notification server computer 171 may furthermore automatically determine how different transaction data elements interact with one another and generate an alert message accordingly.

For example, the user 110, at enrollment, may have ranked alert triggers, from highest to lowest priority, in the following order: 1) Out of Country, 2) ATM use, and 3) transaction amount >100. Subsequently, a transaction may be conducted on the account of the user 110 for € 500 at an ATM in Paris, France. In this situation, the notification server computer 171 may select an alert message template based on the out of country trigger because that alert trigger has the highest priority. The template associated with the out of country trigger may include content stating the country where the transaction occurred. In some embodiments, the template may also include transaction information not directly related to the out of country trigger. In certain embodiments, the notification server computer 171 may incorporate content addressing the transaction amount >100 and ATM use triggers. In particular, the notification server computer 171 may insert language stating the transaction amount and that the transaction occurred at an ATM. In addition, the notification server computer 171 may determine and account for how the different transaction data elements interact with one another. In particular, the notification server computer 171 may determine that because the transaction occurred outside of the country, the transaction amount needs to be converted into dollars. As such, the notification server computer 171 may automatically convert the € 500 value into the approximate dollar value of $720. Thus, embodiments of the invention would generate an alert message stating that "An ATM transaction for € 500 or approximately $720 dollars occurred in Paris, France."

c. Suppressing Alert Messages

In certain embodiments, the notification sever computer 171 may delay or suppress sending of alert messages until a later time. In some embodiments, the notification server computer 171 may suppress alert messages based on the alert trigger with the highest priority in the set of alert triggers that applies to transaction data 174. In particular, the notification server computer 171 may determine whether the alert trigger with the highest priority meets a certain priority threshold. If the alert trigger does not meet the priority threshold, the notification server computer 171 may not send an alert message about the transaction to the user 110 until a later time. For example, a transaction amount trigger may be configured to apply if a transaction exceeds $10. The user 110 may subsequently make purchases for parking at 2 pm for $15 and a meal at 5 pm for $12. These purchases are relatively minor and may not meet a predefined priority threshold. As such, alert messages for the transactions may not be sent until a later time such as at 8 pm.

In some embodiments, the notification server computer 171 may generate an alert message including information regarding all transactions that were suppressed over a certain period. For instance, referring to the previous example, the notification server computer 171 may send a single alert message at the 8 pm including information regarding both the parking and meal transactions.

In certain embodiments, the invention may not send an alert message even where one or more alert triggers apply to the transaction data 174. Specifically, the notification server computer 171 may prevent the sending of an alert message if an enabled alert trigger of a higher priority does not meet the transaction data 174. For example, the user 110 may have previously enabled a transaction amount trigger with a threshold of $20. The user 110 may additionally have enabled a trigger for an out of country transaction. The alert triggers may be prioritized so that the transaction amount trigger has a higher priority than the out of country trigger. As a result, a transaction for $21 outside the country may cause the notification server computer 171 to generate an alert message because both alert triggers apply to the transaction. However, a transaction for $15 outside the country may not cause an alert message to be generated because the higher priority transaction amount trigger was not met.

d. Sending Alert Messages to a Delivery Channel Logic

After an alert message is generated by the notification server computer 171, it is sent to the delivery channel logic 177 for delivery to the user 110. See arrows 6b in FIG. 1. The delivery channel logic 177 may be in the form of one or more software applications running on one or more computers that are tasked with delivery of alert messages to the appropriate delivery channels. In one embodiment, the delivery channel logic 177 may be a third party entity that receives alert messages via network connection 154 and sends the messages to the appropriate user devices.

In one embodiment, alert messages may be sent along with identifiers that specify the delivery channels that are to be used for sending the alert messages. In certain embodiments, the delivery channel logic 177 is in communication with mobile device carriers 190 and e-mail servers 180 for sending alert messages that are readable by the mobile device 200 and in the form of e-mail messages that are readable by user computer 210.

In some embodiments, alert messages may be sent to a user in the form of interactive voice response, instant message, voicemail, and the like. Therefore, FIG. 2 shows that the delivery channel logic 177 is in communication with other delivery channels 178 that can deliver the alert messages to user devices.

In some embodiments, the delivery channel logic 177 may perform alert message generation and delivery channel selection in conjunction with the notification server computer 171. For example, the notification server computer 171 may partially complete an alert message and the delivery channel logic 177 may subsequently finish completion of the alert message. In other embodiments, the delivery channel logic 177 may perform alert generation and delivery channel selection instead of the notification server computer 171. In these embodiments, the delivery channel logic 177 may receive the transaction data 174 or partial portions of the transaction data 174 directly from the notification server computer 171.

B. Alert Delivery Optimization

Figure 6:
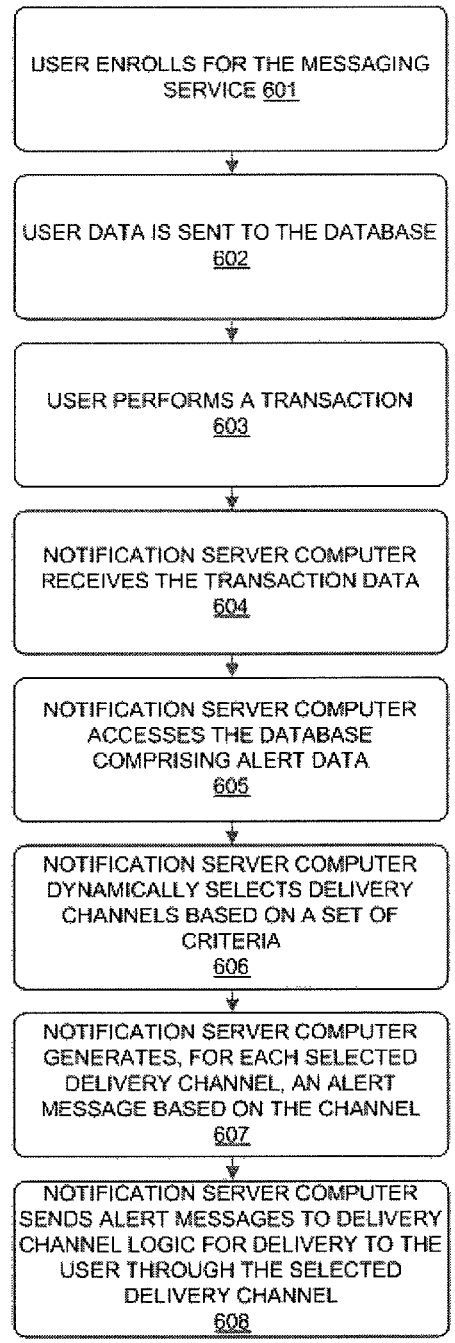
FIG. 6 shows a flowchart illustrating the steps involved in selecting and generating delivery channels, according to a second embodiment of the invention.

FIG. 6 is a flowchart of a second embodiment that illustrates the process from enrollment to the sending of alert messages. As shown in FIG. 6, the user 110 enrolls in the messaging service provided by the alerts messaging system 100 (step 601). The user data that the user 110 provides during the enrollment process is then sent to the database 173 and incorporated with alert data (step 602). The user 110 then performs a transaction using the consumer portable device 120 (step 603). Next, the IP Gateway 170 receives the transaction data 174 from the payment processing network 150 (step 604). After receiving the transaction data 174, the notification server computer 171 in the IP Gateway 170 accesses the database 173 that contains the alert data (step 605). The accessed alert data includes delivery channel information. The notification server computer 171 then dynamically selects one or more delivery channels based on a set of criteria (steps 606). Criteria may include reachability and cost factors. Next, the notification server computer 171 generates, for each selected delivery channel, an alert message based on channel (step 607). Finally, the notification server computer 171 sends the generated alert messages to the delivery channel logic 177 for delivery to the user 110 (step 608).

1. Enrollment

In some embodiments of the present invention, the user 110 may enroll for the messaging service (step 601 in FIG. 6) provided by the alerts messaging system 100 through multiple ways. In some embodiments, the user 110 may be enrolled automatically by the issuer 160 that issues the portable consumer device 120. Enrollment may be done in a batch mode, by file delivery from issuer 160 or by file delivery from some other party. In other embodiments, the issuer 160 or the payment processing network 150 may provide the messaging service as an option to the user 110 at which time the user 110 may enroll in the messaging service either by contacting a customer service representative over the phone (provided either by the issuer 160 or payment processing network 150), or by accessing a web site and filling out an online application. In certain implementations, the web site may be hosted by one entity but can redirect the user 110 to a site hosted by another entity.

During the enrollment process, the user 110 provides information that will be used by the alerts messaging system 100 during the processing of the transaction data 174. The user 110 may provide the information to the alerts messaging system 100 through either accessing a website and filling out an online application or by contacting customer service. The user 110 may later access the web site or contact the issuer 160 to change the information provided at any time.

Information provided by the user 110 may include delivery channel information. In particular, the user 110 may provide information including web service identifiers (such as account user names), mobile phone numbers, voice over IP service account identifiers, email addresses, and the like. The user 110 may additionally provide service plan information such as mobile device voice and data plans. The user 110 may further provide user device characteristics information such as make and model information.

The user 110 may additionally provide information about the alert triggers he or she wants to be enabled or have checked when a transaction is received by the alerts messaging system 100.

In certain embodiments, the user 110 may associate certain categories of alert triggers with certain behavior. For instance, alert messages associated with alert triggers related to transaction amounts may not be sent until the end of the day.

The information that the user 110 provides is stored in the database 173 in the form of cardholder enrollment data 175. This is shown as step 602 in FIG. 6. This data, in addition to the transaction data 174 and issuer data 176, can be referred to as alert data, which is used by the notification server computer 171.

2. Performing a Transaction

FIG. 1 illustrates a process involved in performing a transaction according to an embodiment of the invention. This is shown as step 603 in FIG. 6. In a typical purchase transaction, the user 110 purchases goods or services at the merchant 130 using the portable consumer device 120 (arrow 1 in FIG. 1). An authorization request message comprising transaction data is generated by a processor in the access device 132 after the portable consumer device 120 interacts with the access device 132. The authorization request message may comprise, for example, the BIN (bank identification number) and expiration date associated with the portable consumer device 120, the purchase amount, and a merchant code such as a merchant category code (MCC). The authorization request message is then forwarded from the merchant 130 to the acquirer 140 (arrow 2 in FIG. 1). After receiving the authorization request message, it is then sent to the payment processing network 150 (arrow 3 in FIG. 1).

The payment processing network 150 then forwards the authorization request message to the issuer 160 of the portable consumer device 120 (arrow 4 in FIG. 1). After the issuer 160 receives the authorization request message, the issuer 160 sends an authorization response message back to the payment processing network 150 to indicate whether or not the current transaction is authorized (or not authorized) (arrow 5 in FIG. 1).

After the payment processing network 150 receives the authorization response message, it then forwards the authorization response message back to the acquirer 140 (arrow 6 in FIG. 1). The acquirer 140 then sends the response message back to the merchant 130 (arrow 7 in FIG. 1), and it is then presented to the user 110 (arrow 8 in FIG. 1).

If the user 110 is enrolled in the messaging service, the payment processing network 150 sends the transaction data to the IP Gateway 170 (arrow 6b in FIG. 1). In order for the payment processing network 150 to determine whether the authorization request is associated with a portable consumer device 120 that is enrolled in the messaging service, the payment processing network 150 maintains a list of account numbers associated with users who are enrolled in the messaging service in the enrollment database 152. The data in the enrollment database 152 are synchronized with the appropriate portion(s) of the cardholder enrollment data 175 via synchronization link 156 which may be in any suitable form. For example, the synchronization link 156 may be in the form of local area network connection or Internet.

After the payment processing network 150 receives an authorization response from the issuer 160, an application program, running on a computer (not shown) in payment processing network 150, compares the account number associated with the authorization request (or the authorization response) with a list of enrolled account numbers in the enrollment database 152. If there is a match, which indicates that the account number associated with portable consumer device 120 is enrolled in the messaging service, the payment processing network 150 sends the transaction data 174 associated with that particular transaction to the IP Gateway 170.

3. Processing Transaction Data

After the IP gateway 170 receives the transaction data 174 from the payment processing network 150 (step 604 in FIG. 6), the notification server computer 171 begins processing the transaction data 174. During this process, normal processing for transaction authorization continues as normal with the issuer 160.

In one embodiment, the IP gateway 170 may be part of the payment processing network 150. In other embodiments, the IP gateway 170 may be a third party entity in communication with the payment processing network 150 that receives and processes the transaction data 174. In other embodiments, after the transaction data 174 is received from the payment processing network 150, the notification server computer 171 begins processing the transaction data 174. In one embodiment, the transaction data 174 may be stored in database 173, which is then accessed by the notification server computer 171, along with cardholder enrollment data 175 and/or issuer data 176, for processing. In other embodiments, the transaction data 174 may be sent directly to the notification server computer 171.

The transaction data 174 received from the payment processing network 150 may contain information such as an account number associated with the portable consumer device 120, name of the merchant 130 (or other merchant identifier such as a merchant category code or MCC) and the amount of the transaction. The transaction data 174 may also contain other information such as the location of the merchant 130. In some embodiments, the transaction data 174 may not contain all of the information needed to identify some aspect of the transaction such as the location of the merchant 130. However, the transaction data 174 may contain processing codes and reference numbers that may be used to acquire further needed information regarding a transaction.

In certain embodiments, the notification server computer 171 may determine a set of alert triggers that applies to the transaction data 174. In order to make this determination, the notification server computer 171 may access database 173 comprising of alert data (step 605 in FIG. 6). The notification server computer 171 may then select one or more alert triggers using the alert data, which may comprise of the cardholder enrollment data 175 and/or issuer data 176. For example, the notification server computer 171 may select the ATM use, out of country, and transaction amount triggers based on the cardholder enrollment data 175. This information may have been previously inputted by the user 110 during, for example, the enrollment process.

Upon selecting the one or more alert triggers, notification server computer 171 examines each alert trigger in the set against the particular data elements comprising the transaction data 174. For instance, an out of country trigger may be compared against the merchant location information of transaction data 174. If the merchant location of the transaction is, for instance, in France, the notification server computer 171 will determine that the out of country trigger applies to the transaction data 174. Likewise, a transaction amount trigger may be compared against the amount information of the transaction data 174. If the amount information exceeds the set transaction amount threshold, the notification server computer 171 will determine that the transaction amount trigger additionally applies to the transaction.

By examining each selected alert trigger, the notification server computer 171 can determine a set of alert triggers that applies to the transaction data 174. Examination of the alert triggers may be performed either sequentially or in parallel.

4. Dynamically Selecting Delivery Channels

According to some embodiments, the notification server computer 171 may select an optimal set of one or more delivery channels for sending alert messages (step 606 in FIG. 6). In particular, a processor (which executes code on a computer readable medium) in the notification server computer 171 may dynamically select each delivery channel based on alert data and a set of criteria. In some embodiments, the notification server computer 171 may also base the selection of each delivery channel on the current status of a user device associated with the channel. The set of criteria used by the notification server computer 171 may include the current reach-ability of a user device and associated delivery channel costs.

In some embodiments, the notification server computer 171 may select delivery channels without previous user (and/or issuer and/or payment processing network) initiated configuration of the set of criteria. In some embodiments, the user 110 may have previously configured a default set of criteria. For instance, the user 110 may have statically mapped, as a default, certain delivery channels to a certain alert trigger (e.g., mapping the SMS delivery channel to an ATM use trigger). However, the notification server computer 171 may, at the time an alert message is to be sent, determine that the default delivery channels specified by the set of criteria are currently unsuitable (e.g., the mobile phone of the user 110 may be currently unable to receive SMS messages). As a result, the notification server computer 171 may dynamically select one or more alternate delivery channels based on a set of criteria not previously configured by the user (e.g., the user does not provide delivery channel mappings, trigger parameters, etc.). In some embodiments, the selection/mappings of the one or more delivery channels is not known or determined until after the transaction is received by the notification server computer 171. In particular, the system dynamically selects one or more delivery channels based on suitability (e.g., user device reach-ability and/or delivery channel cost) criteria in substantially real time after a transaction occurs or at a time when an alert message is to be sent.

The dynamic selection of delivery channels is in contrast to conventional messaging systems. For example, in conventional systems (see, for instance, U.S. patent application Ser. No. 11/962,836, the entire disclosure of which is incorporated herein by reference for all purposes), if a user wants to receive an alert message via SMS in the day and via email during the night, the user manually provides the system with such timing information. The user additionally manually maps each time period to either the SMS or email delivery channels. Conventional systems then simply follow these static user mappings in selecting a delivery channel. As such, conventional systems differ from embodiments of the present invention because prior to a transaction, the user (and/or issuer and/or payment processing network) must configure the criteria used for delivery selection. Additionally, prior to a transaction, the mappings of the delivery channels are also already known.

In certain embodiments of the present invention, the notification server computer 171 may select a delivery channel based on the current reach-ability or availability of a user device to receive an alert message through the channel. In particular, the notification server computer 171, as an initial step, may use alert data to determine the delivery channels associated with the user 110. The notification server computer 171 may then determine the reach-ability of each user device associated with the delivery channels. For some user devices, such as mobile phones, the notification server computer 171 may use the device's current location and alert data, which may include service plan information, to determine whether a particular user device is reachable. For example, the user 110 may have previously provided service plan information for his or her VoIP based mobile phone. At the time an alert message is to be sent, the notification server computer 171 may initiate a communication with the mobile phone and receive from the device an IP address originating in a foreign country. The notification server computer 171 may subsequently determine, based on the service plan information, that the user 110 may not receive SMS text messages outside of the country. As such, the notification server computer 171 would not select SMS as a delivery channel. For user devices connected to web based services, the notification server computer 171 may use alert data to determine a web service identifier for the user 110. A web service identifier, for instance, may be an account user name. Thereafter, the notification server computer 171 may query the web service to determine if the user 110 is currently logged on. For example, the notification server computer 171 may determine that the user 110 has a Skype account. The notification server computer 171 may query the service to determine if the user 110 is currently logged onto the Skype network. If it is determined that the user 110 is currently available over Skype, the notification server computer 171 may initiate a chat session with the user 110 to deliver an alert message.

In some embodiments, the notification server computer 171 may select a delivery channel based on cost. Delivery channel cost may include the cost of sending and/or the cost of receiving an alert message through a channel. In particular, the notification server computer 171, as an initial step, may use alert data to determine delivery channels associated with the user 110. The notification server computer 171 may then determine the cost of each delivery channel. In certain embodiments, the notification server computer 171 may use the current location of a user device and/or alert data, which may include service plan information, to determine cost. For example, the user 110 may have previously provided service plan information for his VoIP based mobile phone. At the time an alert message is to be sent, the notification server computer 171 may determine that the user 110 is currently in Japan based on the IP address of the VoIP based mobile phone. The notification server computer 171 may then automatically calculate, based on the provided service plan information and the phone's current location, the cost of sending a text message to the phone. If the cost exceeds a certain cost threshold, the notification server computer 171 does not select the delivery channel. The notification server computer 171, however, may later select a cheaper alternative such as email. In other embodiments, the notification server computer 171 may first determine cost for all delivery channels associated with the user 110. The notification server computer 171 then chooses the lowest cost delivery channel among the delivery channels.

In some embodiments, the notification server computer 171 may select a delivery channel based on both reachability and cost criteria.

As briefly discussed above, in certain embodiments of the invention, the notification server computer 171 may have previously selected one or more delivery channels based on predetermined rules or default criteria prior to the present step. For example, the user 110 may have configured the SMS delivery channel to be selected if a transaction applies to the ATM use trigger. The notification server computer 171 may subsequently determine that the SMS delivery channel is unsuitable for sending alert messages. In particular, the notification server computer 171, upon querying the mobile phone of the user 110, may determine that, at the time, the mobile phone cannot receive text messages because it is out of the country. Therefore, the notification server computer 171 may perform the present step to dynamically select one or more alternate delivery channels.

In other embodiments, the notification server computer may not have previously selected one or more delivery channels.

5. Generating Alert Messages Based on Delivery Channel

In certain embodiments, the notification server computer 171 may generate an alert message for each selected delivery channel (step 607 in FIG. 6). The generation of alert messages may be performed by a processor using a software application stored in the CRM 172 that is running on the notification server computer 171. The combination of such a software application and the notification server computer 171 may be referred to (in some cases) as an "alerts rule engine." In one embodiment, there may be more than one software application running on the notification server computer 171 and working in concert to access various resources such as database 173 to generate the alert messages. In another embodiment, some functions may be performed by an Application Specific Integrated Circuit (ASIC) that may be part of the notification server computer. In some other embodiments, the alert messages may be generated by the combination of software applications and ASICs.

Various tables of different specific messages or alert message templates may be used to generate alert messages. To generate an alert message, the notification server computer 171 may select one or more alert message templates.

The content of an alert message may vary depending on its delivery channel. For example, an alert message to be sent via SMS may include only a short warning stating that a transaction recently occurred and an instruction to check online for more information. An alert message to be sent via email may provide more detailed information such as a transaction amount, location, and merchant name. An alert message to be sent to an online service provided by the issuer 160 may include very sensitive information including a full online history and an associated account number.

There are at least two reasons to generate a different alert message for each delivery channel. First, certain delivery channels have fundamental technical limitations. For instance, SMS text messages are currently limited to 160 characters. A second reason lies in the varying security levels among different delivery channels. For instance, an online account where the user 110 inputs a user name and password is generally more secure than an SMS text message sent to the user's mobile phone. As such, the online account may include more sensitive information such as an account number. In contrast, the SMS text message may be restricted to less sensitive information such as a general warning.

In some embodiments, the notification server computer 171 may format an alert message based on user device characteristics. User device characteristics may include make and model information, screen size, installed operating systems, installed applications, associated access protocol interfaces (APIs), and the like. As mentioned above, the user 110 may have previously provided the user device characteristics information. In other embodiments, user device characteristics information may be obtained from third party data sources.

In some embodiments, the notification server computer 171 may format an alert message based on the technical requirements and/or features of a user device. For example, the notification server computer 171 may use make and model information to determine that a particular mobile phone supports specialized text messages with additional functionality or features. As a result, the notification server computer 171 may format an alert message to include content utilizing the additional functionality or features.

In some embodiments, the notification server computer 171 may determine that a user device, such as mobile device 200, includes an application comprising an interpretative messaging engine. The interpretive messaging engine may be configured to generate an alert message from data provided in a compact protocol format. The compact protocol format may define a set of standards or rules for compact messages that fit within the technical limitations of a particular delivery channel. For instance, a compact message sent to a mobile phone via SMS may fit within the 160 character limitation of SMS.

Upon determining that a user device includes an application comprising an interpretive messaging engine, the notification server computer 171 may generate a compact message in accordance with the compact protocol format. The data comprising the compact message may not be in a user readable format. The data comprising the compact message may include merchant names, merchant category codes, transaction amounts, template identifiers, and the like. After receiving the compact message, the user device's interpretive messaging engine may use the template identifier to select an alert message template. In some embodiments, selection may be made by looking up the template identifier in a table and identifying the alert message template associated with the template identifier. Upon selecting an alert message template, the user device's interpretive messaging engine may generate an alert message using the data provided in the compact message. For example, a user device may receive a compact message including only a merchant name, transaction amount, and template identifier. The interpretative messaging engine may use the template identifier to select an alert message template. The template may read "Your card was used at X for $Y." The interpretative messaging engine may subsequently generate an alert message by replacing X and Y with the merchant name and transaction amount provided in the compact message.

By sending messages in a compact protocol format and generating alert messages at the user device, alert messages may include more information than would be possible if a fully generated alert message was sent directly to the user device.

In other embodiments, the notification server computer 171 may track the total number of alert messages sent by the alerts messaging system 100 to the user 110. In particular, in some embodiments, the notification server computer 171 may increment, by one, a total alerts counter for each alert message that is to be sent. For example, if alert messages are to be sent via email and SMS, the total alerts counter would be incremented by two. In other embodiments, the notification server computer 171 may increment, by one, a total alerts counter for each transaction in which one or more alert messages are to be sent. For example, if alert messages are to be sent via email and SMS for the same transaction, the total alerts counter would only be incremented by one.

The notification server computer 171 may further track the total number of alert messages sent by the alerts messaging system 100 to the user 110 through a delivery channel. Specifically, the notification server computer 171 may increment, by one, a delivery channel alerts counter associated with a particular channel each time an alert message is to be sent through that channel. For example, an email alerts counter would be incremented each time an alert message is to be sent to the user 110 via email.

Table A shows an example of the alert counters. In particular, Table A shows an embodiment where the total alerts counter is incremented for every alert message that is sent, and where the delivery channel alerts counter for a particular channel is incremented for each alert message sent through the channel. For example, if an email and SMS is sent to the user 110, the email and SMS alerts counters are incremented by one. The total alerts counter is incremented by two. This is shown in the first row of the Table A.

TABLE A

| Email Alerts Counter | SMS Alerts Counter | Total Alerts Counter |
| --- | --- | --- |
| 001 | 001 | 002 |
| 002 |  | 003 |
|  | 002 | 004 |

Table B shows another example of the alerts counters. In particular, Table B shows an embodiment where the total alerts counter is incremented for every transaction in which an alert message is sent, and where the delivery channel alerts counter for a particular channel is incremented for each alert message sent through the channel. For example, if an email and SMS is sent to the user 110, the email and SMS alerts counters are incremented by one. The total alerts counter is also incremented by one. This is shown in the first row of the Table B.

TABLE B

| Email Alerts Counter | SMS Alerts Counter | Total Alerts Counter |
| --- | --- | --- |
| 001 | 001 | 001 |
| 002 |  | 002 |
|  | 002 | 003 |

In certain embodiments, the alert messages generated by the notification server computer 171 may include the current number of the total alerts counter and the current number of a particular delivery channel counter. In some embodiments, the delivery channel alerts counter would correspond to the channel in which the alert message is to be sent. For example, an alert message to be sent through email may include the current number of the email alerts counter and the current number of the total alerts counter. In some embodiments, the numbers would include the alert message itself in the count. For example, an alert message may state: "2 email alerts messages have been sent and 3 transactions have occurred where alert messages were sent."

By including the numbers of the alerts counters in alert messages, security may be improved. In particular, a fraudulent message sent to the user 110 would have difficulty knowing and incorporating the current number of messages sent to the user 110 on a total and delivery channel level basis. Furthermore, sorting of alert messages may be made easier for the user 110. In particular, the numbers would provide the user 110 with an idea of the order in which the alert messages were received. Lastly, the numbers would provide the user 110 with an overview of the alert messages sent, and allow the user 110 to notice if any alert message had been skipped.

Other counters are described in U.S. Patent Application No. 61/237,801 and Ser. No. 12/617,268. The entire disclosures of which are incorporated herein by reference for all purposes.

6. Sending Alert Messages to a Delivery Channel Logic

After an alert message is generated by the notification server computer 171, it is sent to the delivery channel logic 177 for delivery to the user 110. See arrows 6b in FIG. 1. The delivery channel logic 177 may be in the form of one or more software applications running on one or more computers that are tasked with delivery of alert messages to the appropriate delivery channels. In one embodiment, the delivery channel logic 177 may be a third party entity that receives alert messages via network connection 154 and sends the messages to the appropriate user devices.

In one embodiment, alert messages may be sent along with identifiers that specify the delivery channels that are to be used for sending the alert messages. In certain embodiments, the delivery channel logic 177 is in communication with mobile device carriers 190 and e-mail servers 180 for sending alert messages that are readable by the mobile device 200 and in the form of e-mail messages that are readable by user computer 210.

In some embodiments, alert messages may be sent to a user in the form of interactive voice response, instant message, voicemail, and the like. Therefore, FIG. 2 shows that the delivery channel logic 177 is in communication with other delivery channels 178 that can deliver the alert messages to user devices.

In some embodiments, the delivery channel logic 177 may perform alert message generation and delivery channel selection in conjunction with the notification server computer 171. For example, the notification server computer 171 may partially complete an alert message and the delivery channel logic 177 may subsequently finish completion of the alert message. In other embodiments, the delivery channel logic 177 may perform alert generation and delivery channel selection instead of the notification server computer 171. In these embodiments, the delivery channel logic 177 may receive the transaction data 174 or partial portions of the transaction data 174 directly from the notification server computer 171.

Figure 7:
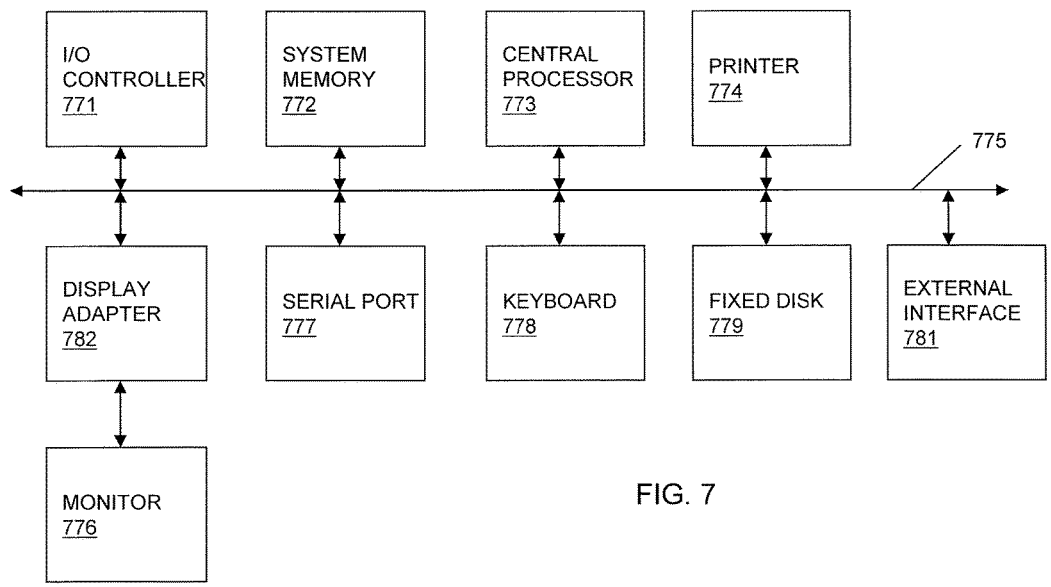
FIG. 7 shows a system according to an embodiment of the invention.

The various participants and elements in the previously described system diagrams (e.g., the computers, issuers, servers, etc. in FIGS. 1 and 2) may use any suitable number of subsystems to facilitate the functions described herein. Examples of such subsystems or components are shown in FIG. 7. The subsystems shown in FIG. 7 are interconnected via a system bus 775. Additional subsystems such as a printer 774, keyboard 778, fixed disk 779 (or other memory comprising computer-readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed. For example, any of the functions described for the notification server may be performed by a processor in the notification server, which may execute code on a computer readable medium. As a further example, any of the functions described for a user device may be performed by a processor in the user device, which may execute code on a computer readable medium.

Any recitation of "a", "an" or "the" is intended to mean "one or more" unless specifically indicated to the contrary.

One or more features of the various embodiments described above, may be combined with other features of other embodiments in any suitable manner without departing from the scope of the invention. For example, one or more features of the prioritization processes and one or more features of the delivery optimization processes may be combined in any suitable manner without departing from the spirit and scope of the invention. For instance, the notification server computer 171 may prioritize alert triggers and select one or more default delivery channels based on alert trigger priority. Subsequently, the notification server computer 171 may dynamically determine whether each selected default delivery channel is suitable. If a delivery channel is not suitable, the notification server computer 171 may dynamically select an alternate delivery channel.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. An alerts messaging system comprising:
    a processor; and
    a computer-readable storage medium coupled to the processor, the computer-readable storage medium comprising code executable by the processor for implementing a set of operations including:
        receiving an authorization request message for a transaction that satisfies multiple alert triggers including a first alert trigger and a second alert trigger, the authorization request message including at least first transaction data satisfying the first alert trigger associated with a first priority value and second transaction data satisfying the second alert trigger associated with a second priority value;
        determining priority values corresponding to the multiple alert triggers satisfied by the transaction;
        determining a priority of the multiple alert triggers based on the priority values corresponding to the multiple alert triggers;
        generating one or more alert messages based on the priority of the alert triggers;
        dynamically selecting an alternate delivery channel that is different than a default delivery channel assigned to the priority of the alert triggers, the alternate delivery channel being dynamically selected based on reachability of a user device; and sending at least one alert message from the generated one or more alert messages to the user device via the alternate delivery channel, the at least one alert message including a count of a total number of transactions that have caused an alert to be sent.

2. The alerts messaging system of claim 1, wherein the count of the total number of transactions that have caused an alert to be sent is incremented by one even when a transaction causes multiple alerts to be sent.

3. The alerts messaging system of claim 1, wherein the at least one alert message further includes a count of a number of alerts that have been sent via the alternate delivery channel.

4. The alerts messaging system of claim 1, wherein the at least one alert message includes information regarding each of the multiple alert triggers that are satisfied by the transaction.

5. The alerts messaging system of claim 1, wherein the alerts messaging system is coupled to a processing network having an enrollment database that contains a list of account identifiers that are enrolled in a messaging service.

6. The alerts messaging system of claim 5, wherein the authorization request message is received by the alerts messaging system in response to the processing network processing the transaction involving an account identifier enrolled in the messaging service.

7. The alerts messaging system of claim 1, wherein the priority value for each of the alert triggers is initially set by an issuer.

8. The alerts messaging system of claim 1, wherein the alert triggers includes one or more of a location based trigger, a time of day based trigger, or a threshold value trigger.

9. The alerts messaging system of claim 1, wherein the set of operations further include tracking a number of alerts sent to the user device.

10. The alerts messaging system of claim 1, wherein the set of operations further include suppressing one or more of the generated alert messages from being sent until a later time based on the priority of the multiple alert triggers.

11. A method comprising:
receiving, by a computing system, an authorization request message for a transaction that satisfies multiple alert triggers including a first alert trigger and a second alert trigger, the authorization request message including at least first transaction data satisfying the first alert trigger associated with a first priority value and second transaction data satisfying the second alert trigger associated with a second priority value;

determining, by the computing system, priority values corresponding to the multiple alert triggers satisfied by the transaction;

determining, by the computing system, a priority of the multiple alert triggers based on the priority values corresponding to the multiple alert triggers;

generating, by the computing system, one or more alert messages based on the priority of the alert triggers;

dynamically, by the computing system, selecting an alternate delivery channel that is different than a default delivery channel assigned to the priority of the alert triggers, the alternate delivery channel being dynamically selected based on reachability of a user device; and sending, by the computing system, at least one alert message from the generated one or more alert messages to the user device via the alternate delivery channel, the at least one alert message including a count of a total number of transactions that have caused an alert to be sent.

12. The method of claim 11, wherein the count of the total number of transactions that have caused an alert to be sent is incremented by one even when a transaction causes multiple alerts to be sent.

13. The method of claim 11, wherein the at least one alert message further includes a count of a number of alerts that have been sent via the alternate delivery channel.

14. The method of claim 11, wherein the at least one alert message includes information regarding each of the multiple alert triggers that are satisfied by the transaction.

15. The method of claim 11, wherein the computing system is coupled to a processing network having an enrollment database that contains a list of account identifiers that are enrolled in a messaging service.

16. The method of claim 15, wherein the authorization request message is received by the computing system in response to the processing network processing the transaction involving an account identifier enrolled in the messaging service.

17. The method of claim 11, wherein the priority value for each of the alert triggers is initially set by an issuer.

18. The method of claim 11, wherein the alert triggers includes one or more of a location based trigger, a time of day based trigger, or a threshold value trigger.

19. The method of claim 11, further comprising:
tracking a number of alerts sent to the user device.

20. The method of claim 11, further comprising:
suppressing one or more of the generated alert messages from being sent until a later time based on the priority of the multiple alert triggers.

* * * * *